(12) United States Patent
Thieman et al.

(10) Patent No.: US 7,341,699 B2
(45) Date of Patent: Mar. 11, 2008

(54) EMISSION ABATEMENT DEVICE AND METHOD OF USING SAME

(75) Inventors: Graham F. Thieman, Columbus, IN (US); Michael D. Virtue, Pontiac, MI (US); David H. Pope, Columbus, IN (US); John D. Warren, Columbus, IN (US)

(73) Assignee: Arvin Technologies, Inc., Troy, MI (US)

( * ) Notice: Subject to any disclaimer, the term of this patent is extended or adjusted under 35 U.S.C. 154(b) by 647 days.

(21) Appl. No.: 10/652,841

(22) Filed: Aug. 29, 2003

(65) Prior Publication Data

US 2004/0067177 A1    Apr. 8, 2004

Related U.S. Application Data

(60) Provisional application No. 60/407,750, filed on Sep. 3, 2002.

(51) Int. Cl.
*B01D 50/00* (2006.01)

(52) U.S. Cl. ..................... 422/177; 422/180
(58) Field of Classification Search ........... 422/171, 422/177, 180; 60/274, 297
See application file for complete search history.

(56) References Cited

U.S. PATENT DOCUMENTS

| | | | |
|---|---|---|---|
| 5,345,762 A | 9/1994 | Lutze | |
| 5,365,733 A | 11/1994 | Takeshima et al. | |
| 5,544,482 A * | 8/1996 | Matsumoto et al. | .......... 60/279 |
| 5,787,706 A | 8/1998 | Smedler et al. | |
| 5,934,069 A | 8/1999 | Hertl et al. | |
| 5,946,906 A | 9/1999 | Akazaki et al. | |
| 6,012,284 A | 1/2000 | Tanaka et al. | |
| 6,182,445 B1 | 2/2001 | Yamazaki et al. | |
| 6,321,533 B1 | 11/2001 | Watanabe et al. | |
| 6,327,852 B1 | 12/2001 | Hirose | |
| 6,334,306 B1 | 1/2002 | Mori et al. | |
| 6,397,586 B1 | 6/2002 | Sakurai et al. | |
| 6,422,006 B2 | 7/2002 | Ohmori et al. | |

FOREIGN PATENT DOCUMENTS

| | | |
|---|---|---|
| EP | 0 891 806 A2 | 1/1999 |
| EP | 0 891 806 A3 | 4/1999 |
| EP | 1 013 902 A2 | 6/2000 |
| EP | 1 013 902 A3 | 1/2003 |
| EP | 1 400 665 B1 | 9/2005 |

OTHER PUBLICATIONS

European Search Report and Annex thereto, Oct. 30, 2003.

* cited by examiner

*Primary Examiner*—Glenn Caldarola
*Assistant Examiner*—Tom P. Duong
(74) *Attorney, Agent, or Firm*—Barnes & Thornburg LLP

(57) ABSTRACT

An emission abatement device comprises a hydrocarbon trap, a 3-way catalyst downstream from the hydrocarbon trap, and a valve movable to control flow of exhaust gas to the hydrocarbon trap and the 3-way catalyst.

12 Claims, 2 Drawing Sheets

US 7,341,699 B2

EMISSION ABATEMENT DEVICE AND METHOD OF USING SAME

This application claims priority under 35 U.S.C. §119(e) to U.S. Provisional Application No. 60/407,750 which was filed Sep. 3, 2002 and is hereby incorporated by reference herein.

FIELD OF THE DISCLOSURE

The present disclosure relates to emission abatement devices and methods of using the same.

BACKGROUND

Emission abatement devices are used to treat exhaust gas discharged from internal combustion engines to reduce the amount undesirable emissions released into the atmosphere. Such undesirable emissions include, for example, unburned fuel (i.e., hydrocarbons), carbon monoxide, and $NO_x$.

SUMMARY

According to an aspect of the present disclosure, an emission abatement device comprises first and second conduits secured to one another at upstream and downstream openings for passage of exhaust gas therethrough between the first and second conduits. An intermediate portion of the first conduit extends from the upstream opening to the downstream opening. A 3-way catalyst is positioned in the first conduit downstream from the downstream opening. A hydrocarbon trap is positioned in the second conduit. A valve is positioned in the intermediate portion and is movable between a closed position and an opened position. In the closed position, the valve is positioned to block passage of exhaust gas through the intermediate portion to force the exhaust gas into the second conduit for passage through the hydrocarbon trap to the 3-way catalyst. In the opened position, the valve is positioned to allow passage of exhaust gas through the intermediate portion and the hydrocarbon trap to the 3-way catalyst.

According to another aspect of the present disclosure, a method of using an emission abatement device comprises the step of passing exhaust gas from a first conduit through an upstream opening into a second conduit and through a hydrocarbon trap positioned therein and a downstream opening back into the first conduit to a 3-way trap positioned in the first conduit without passing exhaust gas through an intermediate portion of the first conduit that extends from the upstream opening to the downstream opening to trap hydrocarbons present in the exhaust gas by the hydrocarbon trap when a valve positioned in the intermediate portion between the upstream opening and the downstream opening is positioned in a closed position. In some embodiments, the method further comprises passing exhaust gas through the intermediate portion to the 3-way catalyst and from the first conduit through the upstream opening into the second conduit and through the hydrocarbon trap and the downstream opening back into the first conduit to the 3-way catalyst to desorb hydrocarbons from the hydrocarbon trap when the valve is positioned in an opened position.

According to another aspect of the present disclosure, an emission abatement device comprises a housing and a tube positioned in the housing to define an outer passageway therebetween. A hydrocarbon trap is positioned in the outer passageway. A 3-way catalyst is positioned downstream from the hydrocarbon trap. A valve is movable between a closed position to block passage of exhaust gas through the tube to force the exhaust gas into the outer passageway to pass through the hydrocarbon trap to the 3-way catalyst and an opened position to allow passage of exhaust gas into the outer passageway through the hydrocarbon trap to the 3-way catalyst and passage of exhaust gas through the tube to the 3-way catalyst.

According to another aspect of the present disclosure, a method of using an emission abatement device comprises passing exhaust gas into an outer passageway defined between a housing and a tube positioned therein through a hydrocarbon trap positioned in the outer passageway to a 3-way catalyst so as to bypass an inner passageway defined by the tube to trap hydrocarbons present in the exhaust gas by the hydrocarbon trap. The method may further comprise passing exhaust gas to the 3-way catalyst through the outer passageway and the hydrocarbon trap and through the inner passageway to desorb hydrocarbons from the hydrocarbon trap.

BRIEF DESCRIPTION OF THE DRAWINGS

The detailed description particularly refers to the accompanying figures in which.

DETAILED DESCRIPTION

Figure 1:
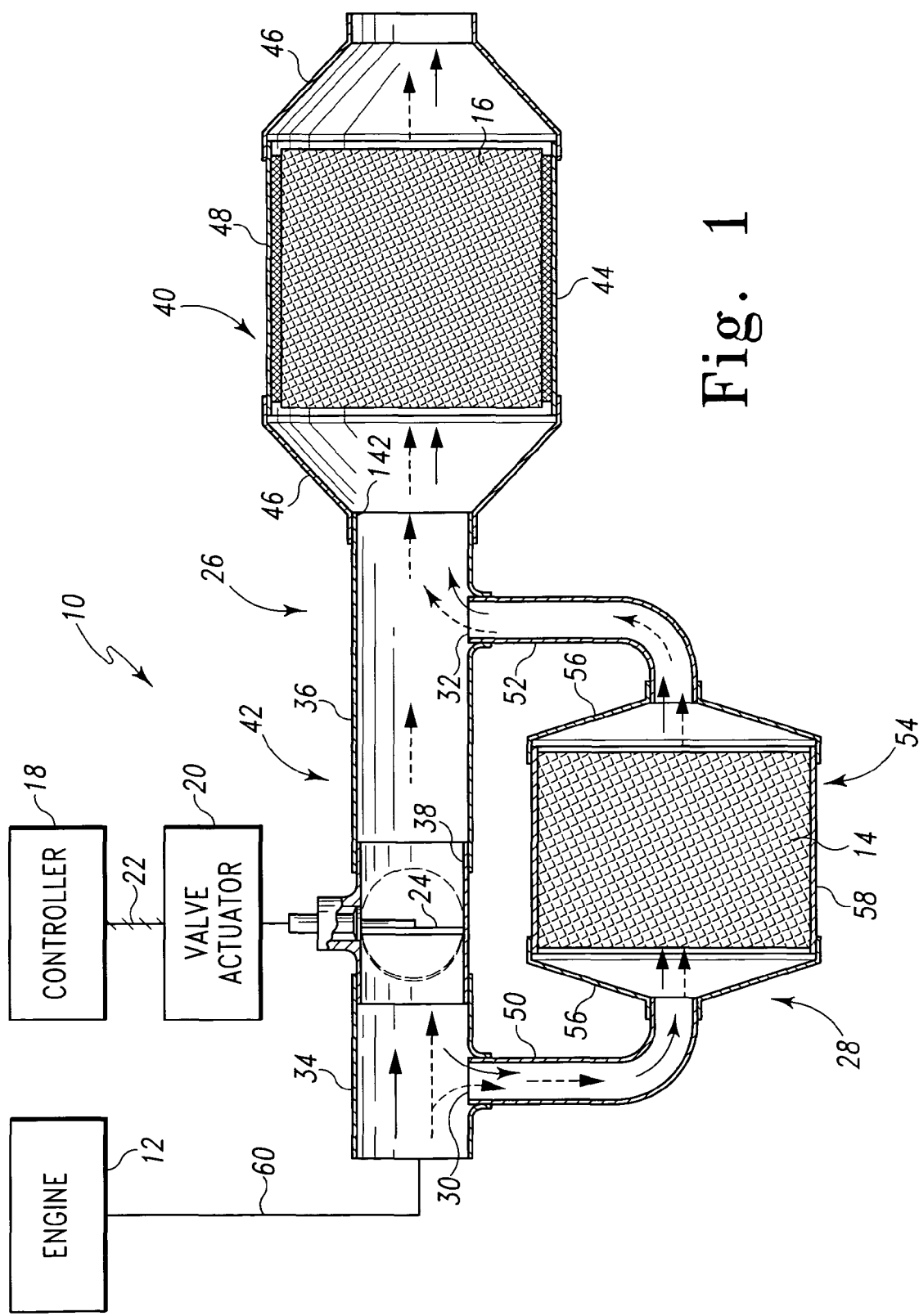
FIG. 1 shows a sectional view of a first embodiment of an emission abatement device.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

An emission abatement device 10 shown in FIG. 1 is configured for use with an internal combustion engine 12 to reduce discharge of undesirable emissions present in exhaust gas generated by the engine 12 into the atmosphere. Such undesirable emissions include, for example, hydrocarbons, carbon monoxide, and $NO_x$. A hydrocarbon trap 14 is used to reduce discharge of hydrocarbons during engine start-up and a 3-way catalyst 16 downstream from the hydrocarbon trap 14 is used to reduce discharge of all three emissions.

The emission abatement device 10 is configured to operate in a hydrocarbon trapping mode and a hydrocarbon desorption mode. In the hydrocarbon trapping mode, the exhaust gas discharged from the engine 12 is routed through the hydrocarbon trap 14 and then through the 3-way catalyst 16 as shown by the solid flow arrows in FIG. 1. The hydrocarbon trap 14 traps hydrocarbons present in the exhaust gas. The hydrocarbon trapping mode is used for a predetermined period of time beginning at start-up of the engine 12. During this "start-up" time period, the exhaust gas becomes hotter as the engine 12 warms up. The heated exhaust gas heats the 3-way catalyst 16 to its activation temperature so as to enable the 3-way catalyst 16 to catalyze, and thus reduce discharge of, hydrocarbons, carbon monoxide, and $NO_x$.

The emission abatement device 10 begins to operate in the hydrocarbon desorption mode at the end of the predetermined start-up time period. In this mode, the exhaust gas discharged from the engine 12 is divided as shown by the phantom flow arrows in FIG. 1. Most of the exhaust gas is routed to the 3-way catalyst 16 without passing through the hydrocarbon trap 14 for treatment by the now heated and operational 3-way catalyst 16. A small amount of the exhaust gas is routed through the hydrocarbon trap 14 so as to desorb hydrocarbons trapped by the hydrocarbon trap 14 during start-up. This small amount of exhaust gas and the desorbed hydrocarbons then pass through the 3-way catalyst 16 for treatment thereby.

A controller 18 is operable to control whether the emission abatement device 10 operates in the hydrocarbon trapping mode or the hydrocarbon desorption mode. To commence operation of the emission abatement device 10 in the hydrocarbon trapping mode, the controller 18 communicates with a valve actuator 20 via an electrical line 22 to move a valve 24 (e.g., a butterfly valve) to a closed position shown in solid lines in FIG. 1. When the controller 18 determines that the predetermined start-up time period has expired, the controller 18 communicates with the valve actuator 20 via the electrical line 22 to move the valve to an opened position (shown in phantom lines in FIG. 1) thereby commencing operation of the emission abatement device 10 in the hydrocarbon desorption mode.

The valve 24 and the catalyst 16 are positioned in a first conduit 26. The hydrocarbon trap 14 is positioned in a second conduit 28. The first and second conduits 26, 28 are secured to one another at an upstream opening 30 and a downstream opening 32.

In the exemplary embodiment described herein, the first conduit 26 comprises a first upstream tube 34, a first downstream tube 36, a valve housing 38, and a catalyst housing 40. The valve housing 38 is secured to the tubes 34, 36 and contains the valve 24 so as to position the valve 24 between the upstream opening 30 and the downstream opening 32 in an intermediate portion 42 of the first conduit 26. The intermediate portion 42 extends from the upstream opening 30 to the downstream opening 32 and is defined in the exemplary embodiment of FIG. 1 by the first upstream tube 34, the first downstream tube 36, and the valve housing 38.

The catalyst housing 40 contains the catalyst 16 and a mat mount 44 that mounts the catalyst 16 in the catalyst housing 40. Illustratively, the catalyst housing 40 comprises a pair of end cones 46 and a cylindrical sleeve 48 that extends therebetween and surrounds the catalyst 16 and the mat mount 44. The upstream end cone 46 is secured to the first downstream tube 36 so that the catalyst 16 is positioned downstream from the downstream opening 32.

In the exemplary embodiment of FIG. 1, the second conduit 28 comprises a second upstream tube 50, a second downstream tube 52, and a trap housing 54 extending therebetween. The first and second upstream tubes 34, 50 are secured to one another at the upstream opening 30. The first and second downstream tubes 36, 52 are secured to one another at the downstream opening 32.

The trap housing 54 contains the hydrocarbon trap 14. Illustratively, the trap housing 54 comprises end cones 56 and a cylindrical sleeve 58. The end cones 56 are secured to the respective tubes 50, 52. The cylindrical sleeve 58 is secured to and extends between the end cones 56 and surrounds the hydrocarbon trap 14.

In operation, the engine 12 supplies exhaust gas to the first upstream tube 34 via an exhaust gas line 60. At engine start-up, the controller 18 operates the emission abatement device 10 in its hydrocarbon trapping mode by positioning the valve 24 in the closed position (as shown in solid lines in FIG. 1). In the solid line closed position, the valve 24 blocks exhaust gas from passing through the intermediate portion 42 so as to force the exhaust gas through the upstream opening 30 into the second conduit 28. The diverted exhaust gas then passes through the hydrocarbon trap 14 where hydrocarbons are trapped. The filtered exhaust gas then flows through the downstream opening 32 back into the first conduit 26 to flow to and though the catalyst 16.

Upon expiration of the predetermined start-up time period, the controller 18 positions the valve 24 in its opened position (as shown in phantom lines) thereby commencing operation of the emission abatement device 10 in its hydrocarbon desorption mode. In the opened position, most of the exhaust gas passes through the first conduit 26 to the now operational catalyst 16 for treatment thereby without diverting through the second conduit 28 and the hydrocarbon trap 14. A small amount of the exhaust gas diverts through the upstream opening 30 into the second conduit so as to pass through the hydrocarbon trap 14 and desorb the hydrocarbons trapped therein. This small amount of exhaust gas and the desorbed hydrocarbons then pass through the downstream opening 32 into the first conduit 26 and through the catalyst 16 for treatment thereby.

Figure 2:
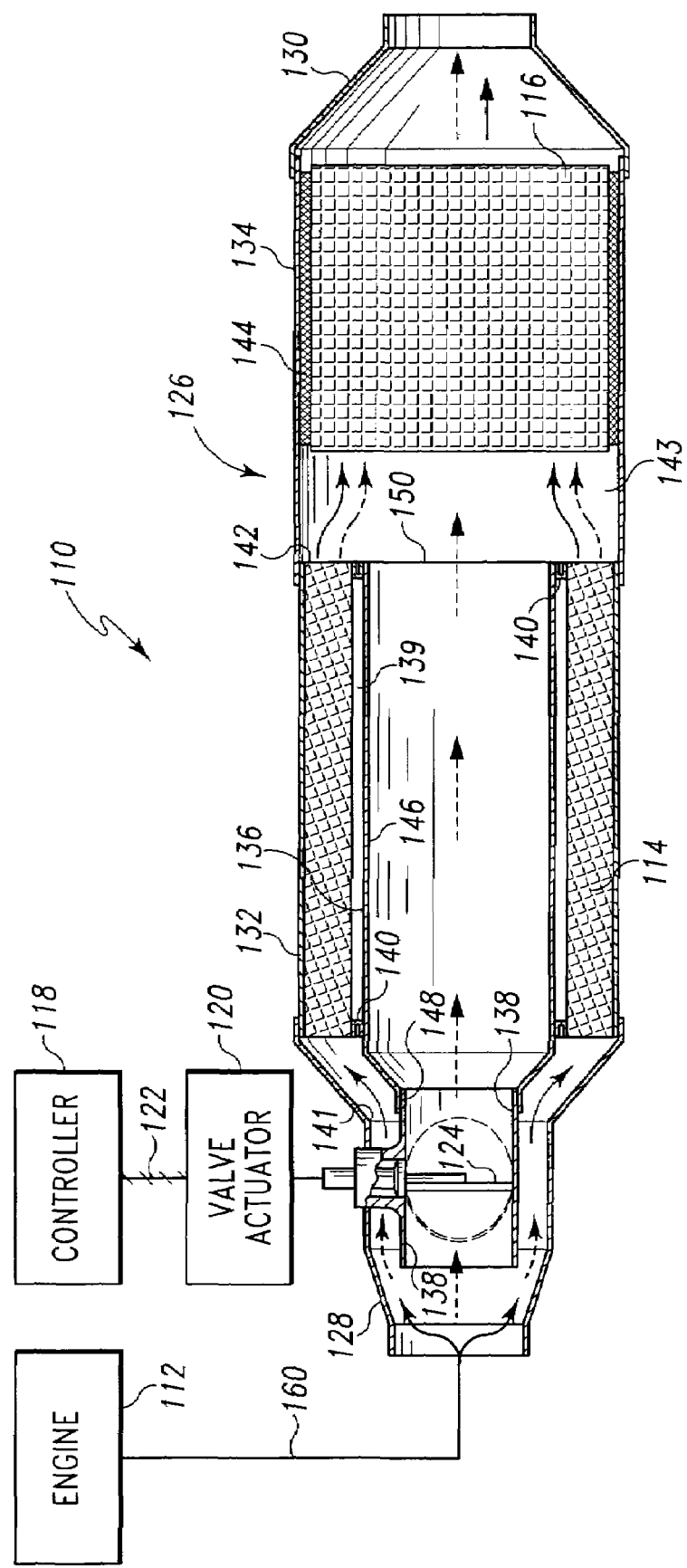
FIG. 2 shows a sectional view of a second embodiment of an emission abatement device.

Another emission abatement device 110 shown in FIG. 2 is configured for use with internal combustion engine 112 to reduce discharge of undesirable emissions present in exhaust gas generated by the engine 112 into the atmosphere. Such undesirable emissions include, for example, hydrocarbons, carbon monoxide, and $NO_x$. A hydrocarbon trap 114 is used to reduce discharge of hydrocarbons during engine start-up and a 3-way catalyst 116 downstream from the hydrocarbon trap 114 is used to reduce discharge of all three emissions.

The emission abatement device 110 is configured to operate in a hydrocarbon trapping mode and a hydrocarbon desorption mode. In the hydrocarbon trapping mode, the exhaust gas discharged from the engine 112 is routed through the hydrocarbon trap 114 and then through the 3-way catalyst 116 as shown by the solid flow arrows in FIG. 1. The hydrocarbon trap 114 traps hydrocarbons present in the exhaust gas. The hydrocarbon trapping mode is used for a predetermined period of time beginning at start-up of the engine 112. During this "start-up" time period, the exhaust gas becomes hotter as the engine 112 warms up. The heated exhaust gas heats the 3-way catalyst 116 to its activation temperature so as to enable the 3-way catalyst 116 to catalyze, and thus reduce discharge of, hydrocarbons, carbon monoxide, and $NO_x$.

The emission abatement device 110 begins to operate in the hydrocarbon desorption mode at the end of the predetermined start-up time period. In this mode, the exhaust gas discharged from the engine 112 is divided as shown by the phantom flow arrows in FIG. 1. Most of the exhaust gas is routed to the 3-way catalyst 116 without passing through the hydrocarbon trap 114 for treatment by the now heated and operational 3-way catalyst 116. A small amount of the exhaust gas is routed through the hydrocarbon trap 114 so as to desorb hydrocarbons trapped by the hydrocarbon trap 114 during start-up. This small amount of exhaust gas and the desorbed hydrocarbons then pass through the 3-way catalyst 116 for treatment thereby.

A controller 118 is operable to control whether the emission abatement device 110 operates in the hydrocarbon trapping mode or the hydrocarbon desorption mode. To commence operation of the emission abatement device 10 in the hydrocarbon trapping mode, the controller 118 communicates with a valve actuator 120 via an electrical line 122 to move a valve 124 (e.g., a butterfly valve) to a closed position (as shown in solid lines in FIG. 1). When the controller 118 determines that the predetermined start-up time period has expired, the controller 118 communicates with the valve actuator 120 via the electrical line 122 to move the valve to an opened position (as shown in phantom lines in FIG. 1) to commence operation of the emission abatement device 110 in the hydrocarbon desorption mode.

The emission abatement device 110 comprises a housing 126 to contain components of the device 110. Illustratively, the housing 126 comprises an inlet cone 128, an outlet cone 130, a first sleeve 132, and a second sleeve 134. The first and second sleeves 132, 134 are secured to one another. The first sleeve 132 is secured to the inlet cone 128. The second sleeve 134 is secured to the outlet cone 130. In some embodiments of the housing 126, the first and second sleeves 132, 134 are replaced by a single sleeve.

A tube 136 is positioned in the housing 126. An annular outer passageway 139 is defined by the area between the tube 136 and the housing 126. The hydrocarbon trap 114 is also annular so as to fit in the outer passageway 139. Retainers 140 are used to mount the trap 114 in the outer passageway 139. An outer inlet opening 141 defined between the housing 126 and the tube 136 is used to admit exhaust gas into the outer passageway 139. An outer outlet opening 142 defined between the housing 126 and the tube 136 is used to discharge exhaust gas from the outer passageway 139 into a chamber 143 defined by the housing 126 between the trap 114 and the catalyst 116.

The tube 136 defines an inner passageway 146. An inner inlet opening 148 is used to admit exhaust gas into the inner passageway 146. An inner outlet opening 150 is used to discharge exhaust gas from the inner passageway 146 into the chamber 143. A valve housing 138 containing the valve 124 is secured to the tube 136 at the inner inlet opening 150.

The catalyst 116 is positioned in the housing 126 downstream from the chamber 143. A mat mount 144 is used to mount the catalyst 116 is the housing 126.

In operation, the engine 112 supplies exhaust gas to the inlet cone 128 via an exhaust gas line 160. At engine start-up, the controller 118 operates the emission abatement device 110 in its hydrocarbon trapping mode by positioning the valve 124 in the closed position. In the closed position, the valve 124 blocks exhaust gas from passing through the inner passageway 146 so as to force the exhaust gas through the outer inlet opening 141 into the outer passageway 139 to pass through the hydrocarbon trap 114, the outer outlet opening 142, the chamber 143, and the 3-way catalyst 116 so as to bypass the inlet passageway 146. The hydrocarbon trap 14 traps hydrocarbons therein as the exhaust gas passes therethrough.

Upon expiration of the predetermined start-up time period, the controller 118 positions the valve 124 in the opened position to commence operation of the emission abatement device 110 in its hydrocarbon desorption mode. In this mode, most of the exhaust gas passes through the valve housing 138, the inner inlet opening 148, the inner passageway 146, the inner outlet opening 150, the chamber 143, and the now operational catalyst 116 without diverting through the outer passageway 139 and the hydrocarbon trap 114. A small amount of the exhaust gas diverts through the outer inlet opening 141 into the outer passageway 139 so as to pass through the hydrocarbon trap 114 to desorb the hydrocarbons trapped therein. This small amount of exhaust gas and the desorbed hydrocarbons then pass through the outer outlet opening into the chamber 143 and through the catalyst 116 for treatment thereby.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus and methods described herein. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An emission abatement device comprising:
    a housing,
    a tube positioned in the housing to define an outer passageway between the housing and the tube and that defines an inner passageway,
    a hydrocarbon trap positioned in the outer passageway,
    a 3-way catalyst in the housing positioned downstream from the hydrocarbon trap,
    a valve movable between (i) a closed position to block passage of exhaust gas through the inner passageway to force the exhaust gas into the outer passageway to pass through the hydrocarbon trap to the 3-way catalyst and (ii) an opened position to allow passage of exhaust gas to the 3-way catalyst through the outer passageway and the hydrocarbon trap and through the inner passageway, and
    wherein, the 3-way catalyst is spaced along an axis of the housing apart from the hydrocarbon trap and the tube, to define a chamber that is located in the housing between the 3-way catalyst and both the hydrocarbon trap and the tube, and that connects the outer and inner passageways with the 3-way catalyst to conduct exhaust gas from the outer and inner passageways through the chamber to the 3-way catalyst, and
    wherein, the hydrocarbon trap is spaced apart from the tube to define a gap therebetween.

2. The emission abatement device of claim 1, wherein the housing and the tube define an outer outlet opening to discharge exhaust gas from the outer passageway, and the tube defines an inner outlet opening to discharge exhaust gas from the inner passageway.

3. The emission abatement device of claim 1, comprising a controller operable to position the valve in the closed position for a predetermined period of time.

4. The emission abatement device of claim 1, comprising a controller operable to move the valve from the closed position to the opened position upon expiration of a predetermined period of time.

5. The emission abatement device of claim 1, wherein:
    the housing comprises a first sleeve and as second sleeve secured to the first sleeve,
    the tube is positioned in the first sleeve,
    the hydrocarbon trap is positioned in the first sleeve between the first sleeve and the tube, and the 3-way catalyst is positioned in the second sleeve outside of the tube.

6. The emission abatement device of claim 5, wherein the chamber is defined by the second sleeve.

7. The emission abatement device of claim 5, wherein the housing comprises an inlet cone and an outlet cone, the inlet cone is secured to the fist sleeve, and the outlet cone is secured to the second sleeve.

8. The emission abatement device of claim 1, wherein the housing comprises a sleeve, the tube is positioned in the sleeve, the hydrocarbon trap is positioned in the sleeve between the sleeve and the tube, the 3-way catalyst is positioned in the sleeve outside of the tube, and the chamber is defined in the sleeve between the 3-way catalyst and both of the hydrocarbon trap and the tube.

9. The emission abatement device of claim 1 further comprising a first retainer positioned between the hydrocarbon trap and the tube to space the hydrocarbon trap apart from the tube.

10. The emission abatement device of claim 9 further comprising a second retainer positioned between the hydrocarbon trap and the tube to space the hydrocarbon trap apart from the tube.

11. The emission abatement device of claim 10, wherein the first retainer is located at a first end of the hydrocarbon trap, and the second retainer is located at a second end of the hydrocarbon trap.

12. The emission abatement device of claim 1, wherein the outer passageway is annular.

* * * * *